United States Patent
Collison

(10) Patent No.: US 10,112,371 B2
(45) Date of Patent: Oct. 30, 2018

(54) FLOOR UNDERLAYMENT

(71) Applicant: MP Global Products, L.L.C., Norfolk, NE (US)

(72) Inventor: Alan B. Collison, Pierce, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 213 days.

(21) Appl. No.: 15/219,821

(22) Filed: Jul. 26, 2016

(65) Prior Publication Data

US 2018/0029346 A1 Feb. 1, 2018

(51) Int. Cl.
*B32B 37/06* (2006.01)
*B32B 38/00* (2006.01)
*E04F 15/18* (2006.01)
*E04F 15/20* (2006.01)

(52) U.S. Cl.
CPC ............ *B32B 37/06* (2013.01); *B32B 38/004* (2013.01); *E04F 15/187* (2013.01); *E04F 15/203* (2013.01); *B32B 2305/022* (2013.01); *B32B 2307/304* (2013.01); *B32B 2317/16* (2013.01); *B32B 2323/046* (2013.01); *B32B 2419/00* (2013.01)

(58) Field of Classification Search
CPC ........ E04F 15/22; E04F 15/045; B32B 37/06; B32B 37/182
See application file for complete search history.

(56) References Cited

U.S. PATENT DOCUMENTS

| | | |
|---|---|---|
| 2,147,058 A | 2/1939 | Randall et al. |
| 3,025,202 A | 3/1962 | Morgan et al. |
| 3,733,381 A | 5/1973 | Wilette et al. |
| 3,773,598 A | 11/1973 | Taeffner et al. |
| 3,819,462 A | 6/1974 | Starr et al. |
| 4,044,768 A | 8/1977 | Mesek et al. |
| 4,082,878 A | 4/1978 | Boe et al. |
| 4,138,521 A | 2/1979 | Brown |
| 4,172,170 A | 10/1979 | Foye |
| 4,187,337 A | 2/1980 | Romageon |
| 4,360,554 A | 11/1982 | Campbell et al. |

(Continued)

FOREIGN PATENT DOCUMENTS

| | | |
|---|---|---|
| EP | 0 629 755 | 10/1998 |
| GB | 1328438 B2 | 8/1973 |

(Continued)

OTHER PUBLICATIONS

Quiet-Cor Underlayment (facsimile date of around Feb. 1999).

*Primary Examiner* — Paola Agudelo
(74) *Attorney, Agent, or Firm* — Harness, Dickey & Pierce, P.L.C.

(57) ABSTRACT

A method of installing a laminate wood floor over a subflooring is provided. The method includes a layered composition including a foam sheet and a melted portion, the melted portion being a surface polymer layer that provides a smooth surface. The foam sheet being a polymer that provides cushioning, the foam sheet and the melted portion being formed of the same material. The method includes placing the layered melted portion-foam composition over the subflooring. The method further includes laying the laminate wood floor over the layered melted portion-foam composition.

20 Claims, 1 Drawing Sheet

(56) References Cited

U.S. PATENT DOCUMENTS

| | | | |
|---|---|---|---|
| 4,504,537 A | 3/1985 | Mussallem, Jr. | |
| 4,505,964 A | 3/1985 | Dierichs et al. | |
| 4,511,605 A | 4/1985 | McCartney | |
| 4,512,530 A | 4/1985 | Rauschert et al. | |
| 4,647,484 A * | 3/1987 | Higgins | B32B 25/08 428/40.4 |
| 4,719,723 A | 1/1988 | Van Wagoner | |
| 4,908,176 A | 3/1990 | Kato | |
| 4,917,750 A | 4/1990 | Klose | |
| 4,927,705 A | 5/1990 | Syme et al. | |
| 4,988,551 A | 1/1991 | Zegler | |
| 5,080,944 A | 1/1992 | Kauffman et al. | |
| 5,082,705 A | 1/1992 | Rose | |
| 5,103,614 A | 4/1992 | Kawaguchi et al. | |
| 5,114,773 A | 5/1992 | Bogdany | |
| 5,292,577 A | 3/1994 | VanKerrebrouck et al. | |
| 5,501,895 A | 3/1996 | Finley et al. | |
| 5,507,906 A | 4/1996 | Woods et al. | |
| 5,514,722 A | 5/1996 | Di Geronimo | |
| 5,531,849 A | 7/1996 | Collins et al. | |
| 5,545,276 A | 8/1996 | Higgins | |
| 5,578,363 A | 11/1996 | Finley et al. | |
| 5,612,113 A | 3/1997 | Irwin, Sr. | |
| 5,624,424 A | 4/1997 | Saisaka et al. | |
| 5,773,375 A | 1/1998 | Swan et al. | |
| 5,716,472 A | 2/1998 | Rossetti | |
| 5,733,624 A | 3/1998 | Syme et al. | |
| 5,762,735 A | 6/1998 | Collins et al. | |
| 5,763,040 A | 6/1998 | Murphy et al. | |
| 5,770,295 A | 6/1998 | Alderman | |
| 5,844,009 A | 12/1998 | Hurley et al. | |
| 5,846,461 A | 12/1998 | Collins et al. | |
| 5,952,076 A * | 9/1999 | Foster | B32B 27/32 428/215 |
| 5,968,630 A * | 10/1999 | Foster | B32B 27/32 428/317.7 |
| 5,972,166 A | 10/1999 | Helwig et al. | |
| 5,987,833 A | 11/1999 | Heffelfinger et al. | |
| 6,189,279 B1 | 2/2001 | Fiechtl | |
| 6,305,920 B1 | 10/2001 | Kean et al. | |
| 6,383,623 B1 | 5/2002 | Erb, Jr. | |
| 6,399,694 B1 | 6/2002 | McGrath et al. | |
| 6,440,341 B1 | 8/2002 | Mussallem, III | |
| 6,576,577 B1 | 6/2003 | Garner | |
| 6,607,803 B2 | 8/2003 | Foster | |
| 6,838,147 B2 | 1/2005 | Burns, Jr. et al. | |
| 6,986,229 B2 | 1/2006 | Collison et al. | |
| 7,096,631 B1 * | 8/2006 | Counihan | E04F 15/22 52/403.1 |
| 7,610,731 B1 * | 11/2009 | Collison | E04F 15/087 428/492 |
| 7,721,498 B2 * | 5/2010 | Kang | E04F 15/203 52/177 |
| 8,209,929 B2 | 7/2012 | Collison et al. | |
| 8,341,910 B2 | 1/2013 | Collison et al. | |
| 8,341,911 B2 | 1/2013 | Collison et al. | |
| 8,938,925 B2 | 1/2015 | Collison et al. | |
| 9,334,659 B2 | 5/2016 | Collison et al. | |
| 2002/0025751 A1 | 2/2002 | Chen et al. | |
| 2002/0088193 A1 * | 7/2002 | Reimers | C08L 23/0815 52/403.1 |
| 2003/0129911 A1 * | 7/2003 | Lewallyn | A47G 27/0468 442/386 |
| 2004/0137212 A1 * | 7/2004 | Ochoa | A01K 1/0157 428/319.3 |
| 2006/0096223 A1 * | 5/2006 | Kyoung Taek | E04F 15/02 52/578 |
| 2006/0156663 A1 * | 7/2006 | Mao | B32B 3/30 52/403.1 |
| 2007/0039268 A1 * | 2/2007 | Ambrose, Jr. | B32B 5/02 52/403.1 |
| 2014/0260025 A1 * | 9/2014 | Nieminski | E04H 3/10 52/302.1 |
| 2018/0029346 A1 * | 2/2018 | Collison | B32B 37/06 |

FOREIGN PATENT DOCUMENTS

| | | |
|---|---|---|
| JP | 2196643 A | 8/1990 |
| WO | WO 1994/012574 | 6/1994 |
| WO | WO 1997/035056 | 9/1997 |

* cited by examiner

FLOOR UNDERLAYMENT

FIELD

The present teachings relate to foam compositions for use in combination with wood laminate flooring over concrete or wood subflooring.

BACKGROUND

This section provides background information related to the present disclosure that is not necessarily prior art. Example embodiments will now be described more fully with reference to the accompanying drawings. As indicated above, processes for preparing floor underlayment, such as medium density floor underlayment, are known to those skilled in this art.

Textile pads are widely used in flooring applications. A pad is desirable when wood flooring is applied over sub flooring. These pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the sub flooring, and may provide a barrier against moisture and dirt. Finally, pads may lessen impact stresses on the flooring to lengthen the life of the flooring and make the flooring appear to be more durable and of a higher quality. Traditionally, these pads are formed when fibers of various sizes and materials are mixed and bound together. The binding can occur using know techniques such as needling or by the use of meltable binder fibers such as polypropylene. These techniques, while functional have several disadvantages which lead to slow throughput, high energy and cost, and environmental emissions.

In the construction of buildings having concrete subfloors, it is known to install a thin layer of integral polyethylene foam having a separate vapor barrier layered thereon. The concrete subflooring, followed by a layer of polyethylene foam sheet on the thin integral polyethylene vapor barrier, and vice versa, and then to install wood flooring on top of the polyethylene foam sheet layer. None of the layers or flooring are adhered to any of the other layers or flooring. The polyethylene foam sheet takes out small irregularities in the top surface of the concrete. The polyethylene foam sheet also provides some sound reduction. Slight cushioning is provided by the polyethylene foam sheet to alleviate the problems suffered by persons walking and standing on such floors. These foam insulative pads are unfortunately expensive to make and if made of a bi-material construction not recyclable.

SUMMARY

This section provides a general summary of the disclosure, and is not a comprehensive disclosure of its full scope or all of its features.

The objects and advantages of the teachings are achieved by the compositions, products, articles of manufacture and processes of the teachings.

The teachings involves a layered composition of polyethylene foam sheet and integral polyethylene melted portion used in the installation of laminate wood floors to provide both a vapor-barrier and cushioning.

The laminate composition is installed in a free-floating manner on the subflooring, with the integral polyethylene melted portion or the polyethylene foam sheet contacting the surface of the concrete subflooring. The laminate composition is usually in long layers that come in rolls. In the preferred embodiment where one side of the integral polyethylene melted portion has a thin film that extends a vapor barrier beyond one edge of the polyethylene foam sheet, the integral polyethylene melted portion and film being placed adjacent the concrete subflooring. The laminate composition is installed so that one edge of one layer overlies the extended portion of the integral polyethylene melted portion of another layer. In this manner the edges of the two layers do not have to be coupled together to keep the layers from moving during installation of the laminate wood flooring.

According to another teaching, a laminate composition of a thin polyethylene foam sheet integrally coupled to a thin integral polyethylene melted portion is used in the installation of laminate wood floors to provide a vapor-barrier, cushioning, sound reduction, etc.

The laminate composition of the teachings is a combination of sound-reducing polyethylene foam sheet and vapor-barrier integral polyethylene melted portion. The laminate composition can be provided in the form of a single-roll foam/melted portion underlayment, which reduces labor cost and time in its installation. If the foam sheet and the melted portion (in the form of a separate film), were in separate form, installers would have to deal with two separate rolls and the increased labor cost and installation time. Separate melted portion and foam sheet would make installation more difficult and costly.

The teachings also involves a process of preparing the layered composition, a process of installing the teachings laminate composition in a flooring arrangement of a concrete subflooring and a laminate wood flooring, and such flooring arrangement which includes the laminate composition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The description in this specification is primarily done with polyethylene for the polyethylene foam sheet and the integral polyethylene melted portion. The polyethylene, for example, can be high density polyethylene or low density polyethylene, but the preferred polyethylene is low density polyethylene. But the teachings also more broadly include the use of polyethylenic resins.

Figure 1:
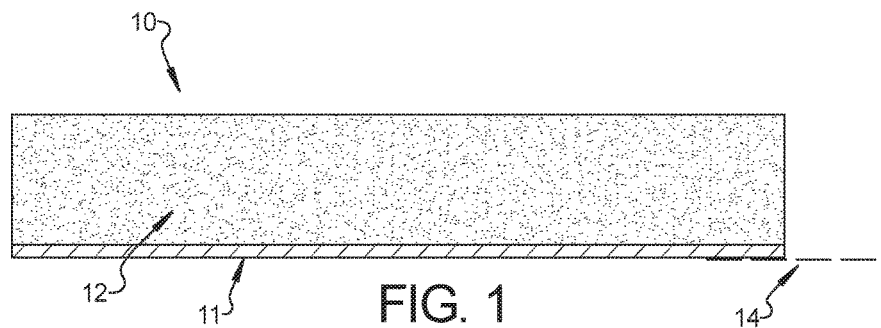
FIG. 1 is a cross-sectional view of the layered composition of the preset teachings.

In FIG. 1, laminate composition 10 includes bottom melted portion 11 and top foam sheet 12. An optional film portion 14 coupled to the bottom melted portion 11 extends (preferably 6 inches) beyond one side of foam sheet 12. Bottom melted portion 11 is composed of low density polyethylene. Top foam sheet 12 is composed of low density polyethylene foam having a density of about 2 pounds per cubic foot. The process of preparing laminate is described below in the description of FIG. 2.

The polyethylenic resins used in the teachings process can be those obtained by polymerizing ethylene, or polymerizing ethylene with other aliphatic monoolefins, such as, propylene, 1-butene, 1-pentene, 3-methyl-1-butene, 4-methyl-1-pentene, 4-methyl-1-hexene, or 5-methyl-1-hexene alone or mixtures.

Examples of polyethylenic resins which can be advantageously employed in the teachings are low-, medium- and high-density polyethylenes, ethylene/vinyl acetate copolymer, ethylene/propylene copolymer, copolymers of ethylene and methyl or ethyl acrylate, blends of polyethylene and polypropylene, blends of polyethylene and ethylene/vinyl acetate copolymer, and blends of polyethylene and ethylene/propylene copolymer. Of these, the medium density polyethylenes, low density polyethylenes, and ethylene/propylene copolymers are especially suitable. The density can be 2.0 pounds per cubic foot nominal (+/−10%) having a range of 1.8-2.2 pounds per cubic foot. It is envisioned the density can have a range of 1.5-2.5 pounds per cubic foot. By way of definition, integral polyethylene melted portions are 10 mils thick or less, and polyethylene foam sheets are greater than 10 mils thick.

The polyethylene foam sheet can be formed by means of a conventional polyethylene foam sheet extrusion process or any other suitable foam sheet-forming process. In a typical, conventional polyethylene foam sheet extrusion process, pellets of the thermoplastic polyethylene resin are blended with a solid phase nucleating agent and, then, are melted in a heated extruded where the plastic and nucleating agent combination is held at both a high temperature and a high pressure.

The physical blowing agent(s), which generally liquefies within the extruder, and which will vaporize at die melt temperatures and atmospheric pressure, is added to the pressurized melted material. Within the molten extrudate, the blowing agent(s) tends to act as a plasticizer to reduce the viscosity of the extrudate, and, thus, it lowers the level of temperature necessary to maintain the hot melt condition of the mixture of thermoplastic polyethylene material and nucleating agent. The blowing agent(s) is mixed with the melted polyethylenic plastic and nucleating agent, and the combination is, subsequently, cooled to an extrusion temperature suitable for foaming.

The process can be usually operated on a continuous basis using a conventional extruder system. A nucleating agent (cell size control agent) can be any conventional or useful nucleating agent(s). The cell size agent can be used in an amount of 0.5 to 2.0 weight percent, depending upon the desired cell size, based upon the weight of the polyethylenic resin. Examples of the cell size control agents are inorganic cell size-controlling agents (in very small particulate form), such as, clay, talc, silica, and organic cell size-controlling agents which decompose or react at the heating temperature within the extruder to evolve gases.

Suitable volatile blowing agents include halocarbons such as fluorocarbons and chlorofluorocarbons; hydrohalocarbons such as hydrofluorocarbons and hydrochlorofluorocarbons; alkylhalides such as methyl chloride and ethyl chloride; hydrocarbons such as alkanes or alkenes; and the like. Other suitable blowing agents include pristine blowing agents such as air, carbon dioxide, nitrogen, argon, water, and the like. The blowing agent may comprise a mixture of two or more of any of the above blowing agents.

The blowing agent(s) can be inorganic halogen-free blowing agents which are environmentally acceptable and inflammable. Examples of the inert inorganic atmospheric gases are argon, carbon dioxide, water, nitrogen, neon, helium and krypton (but not, for example, oxygen, ozone, sulfur dioxide, methane or nitrous oxide). Mixtures can be used. When two blowing agents are used, they can be individually injected into separate injection ports or they can be injected together into the same injection port in the mixing extruder. The argon blowing agent usually is used at a rate of 0.1 to 4 weight percent, preferably 0.1 to 2.0 weight percent, of the total extruder flow rate. The carbon dioxide blowing agent usually is used at a rate of 0.5 to 7.0 weight percent, preferably 0.5 to 5.0 weight percent, of the total extruder flow rate. The nitrogen blowing agent usually is used at a rate of 0.1 to 2 weight percent of the total extruder flow rate.

The foam sheet provides sound reduction and cushioning. The density of the polyethylene foam sheet is a low density, usually between 1 pounds per cubic foot and 6 pounds per cubic foot, typically between about 1.0 pounds per cubic foot and about 2.5 pounds per cubic foot, preferably about 1.9 pounds per cubic foot to about 2.1 pounds per cubic foot. The polyethylene foam sheet is preferably can have any other suitable thickness (e.g., between about 0.03 inch and about 0.25 inch in thickness).

The polyethylene foam sheet should preferably be a closed celled in the sense that the at least half of the cells are closed cells and preferably at least 80 percent of the cells are closed cells. A high closed cell content is advantageous because the polyethylene foam sheet then has a slight degree of elasticity while having the necessary structural integrity and resilience when subjected to transient or static loads of light or comparative heavy values.

Figure 2:
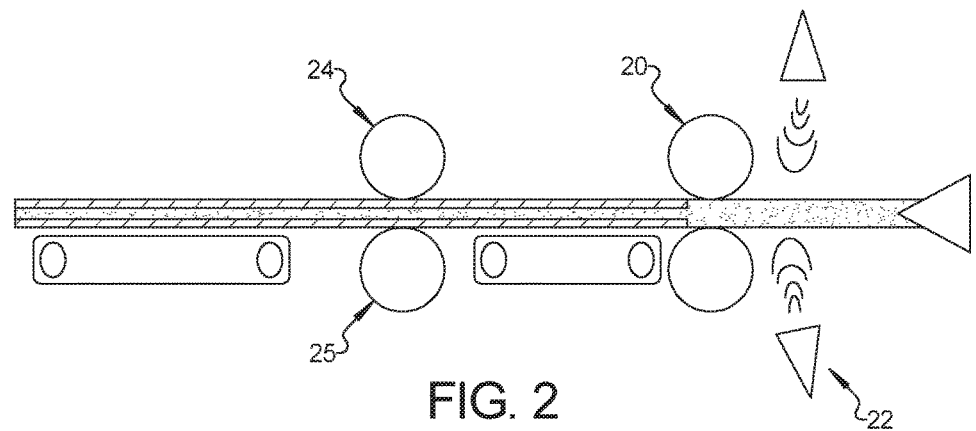
FIG. 2 is a side view of one method of forming the layered composition of FIG. 1.

As shown in FIG. 2, the integral polyethylene melted portion can be formed by means of a heating process or any other suitable melted portion-forming process. The melted portion can be formed by the application of heat to the top or top and bottom surfaces of the foam sheet. The thin integral polyethylene melted portion is formed on the foam sheet using a continuous basis by elevating the surface temperature of the foam until it reaches a molten or semi-molten state by use of heated rollers 20, a series of radiation emitters such as laser diodes 22, or the application of heated gas. The polyethylene foam is then pressed between rollers over which the melted portion passes as a double layer.

Other conventional integral polyethylene melted portion extrusion processes are the chill roll process and the water quench process. A slot die is used in the chill roll process. Molten polyethylene from the die goes to a highly polished, temperature-controlled roll which cools and solidifies it. The water quench method is similar to the chill roll process except that the extrudate is cooled in a water bath.

The thin integral polyethylene melted portion can also contain flame retardants, stabilizers, antioxidants, colorants, fillers, plasticizers or any other conventional or suitable additives.

The thin integral polyethylene melted portion preferably is about 5 mils (0.005 inch) thick but can have any other suitable thickness [e.g., between about 0.001 (or about 0.00075 inch) and about 0.1 inch in thickness]. Preferably the polyethylene foam sheet is low-density polyethylene foam sheet having a thickness of about 0.006 inch to about 0.00075 inch.

The edge portion of one longitudinal side of the integral polyethylene melted portion preferably has a film layer that extends (6 inches) beyond the longitudinal side of the polyethylene foam sheet. When two layers of the laminate composition are installed adjacent to each other, one edge of one layer overlies the extended edge portion of the integral polyethylene melted portion of another layer. The edges of the two do not have to be taped, due to the overlay, to keep the layers from moving during installation of the laminate wood flooring, etc.

The polyethylene foam sheet and the integral polyethylene melted portion are integrally layered together by any suitable means. Preferably the polyethylene foam is extruded in sheet form and essentially immediately thereafter the integral polyethylene melted portion is formed using a heated non-stick roller or the application of radiant energy or forced heated gas.

One process of preparing the laminate composition involves heating a moving continuous web of a thin sheet of polyethylene foam. An energy is applied to the facing surfaces of the moving under sufficient pressure (without damaging the polyethylene foam) is applied by two opposing rollers to the contacting webs at the point of contact of the moving webs to achieve the laminate composition.

In FIG. 2, an extruded web 12 of low density polyethylene foam is subjected to heat to melt the upper foam surface. This heat can be applied using rollers, light, or heated air. The sheet and low density integral polyethylene melted portion are fed between chill rolls 24 and 25. Extruded web 12, coming from an extruder and an oven(s) at the proper cell height and preferably at a temperature of about 4500.degree. F., is immediately fed to chill rolls 24 and 25. At this point, extruded web 12 has a density of about 2.1 to about 2.2 pounds per cubic foot. Extruded web 11 is usually at room temperature or slightly higher as it is fed to chill rolls 24 and 25.

Figure 3:
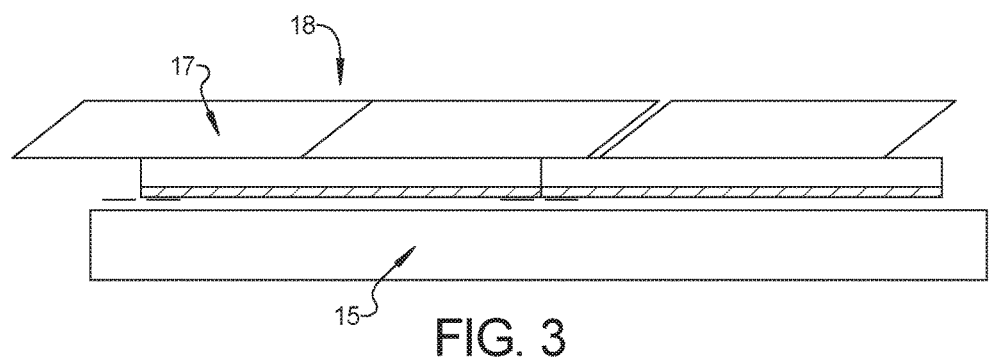
FIG. 3 is a cross-sectional view of a floor including the laminate composition of FIG. 1.

As shown in FIG. 3, the subflooring is preformed or precast concrete, cast-in-place concrete or reinforced concrete (i.e., contains added material of high strength, such as, steel rods or bars). The laminate wood flooring can be any suitable one including those which are commercially available. (Any other suitable free-floating finish flooring can be used in place of the laminate wood finish flooring.)

An example of a suitable laminate wood (finish) flooring, in plank form, is one which has a four-ply construction and which is used where there is high personnel traffic, for example. The top (first) ply is a clear translucent layer and is a durable wear and stain resistant, resilient finish. The next (second) ply is an image design layer upon which product patterns, such as, wood, marble or granite patterns are printed. The third ply is a moisture resistant, high-density core material that maintains the structural integrity of each precision engineered plank. The bottom (fourth) ply is composed of melamine for structural stability and seals the bottom of each laminate wood plank flooring for additional stability and moisture resistance. The four-ply construction is fused together under tremendous heat and pressure to form a single plank.

When installing a wood laminate floor over a concrete slab, the installer first lays down a vapor-barrier of integral polyethylene melted portion, and then apply a closed-cell polyethylene foam sheet for both cushioning and sound reduction. The vapor-barrier is not necessary, however, when installing over a wood sub-floor such as plywood, or a preexisting wood floor. The teachings replaces the separate integral polyethylene melted portion and the separate polyethylene foam sheet with the teachings laminate composition of a polyethylene foam sheet layered with a integral polyethylene melted portion. Thereby, installation is less complicated, quicker, more reliable and less costly.

The laminate composition 10 is positioned on reinforced concrete subflooring 15 (with steel reinforcing rods 16) in a free-lying manner. Laminate composition 10 is in the form of layers, two adjacent layers. Laminate composition 10 is not adhered to concrete subflooring 15. Bottom melted portion 11 contacts the top surface of concrete subflooring 15. Planks 17 of laminate wood flooring are positioned on laminate composition 10 in a free-lying manner. Planks 17 fit together by means of tongue-in-groove arrangement and are glued together. Laminate composition 10 is not adhered to laminate wood flooring 17. Top sheet 12 contacts the bottom surface of laminate wood flooring 17.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of installing a laminate wood floor over a subflooring, comprising:
    providing a layered melted portion-foam composition including a foam sheet having a melted portion integrally formed, the foam sheet being a polyethylenic resin having a thickness between about 0.03 to about 0.25 inches and a density of about 1 to about 5 pounds per cubic foot, the melted portion being a polyethylenic resin having a thickness of about 1 to about 10 mils;
    placing the layered melted portion-foam composition over the subflooring; and
    laying the laminate wood floor over the layered melted portion-foam composition.

2. The method of claim 1, wherein the melted portion of the layered melted portion-foam composition is contacting the subflooring.

3. The method of claim 1, wherein, after the laying step, the laminate wood floor is a free-floating laminate wood floor.

4. The method of claim 1, wherein the melted portion of the layered melted portion-foam composition is contacting the laminate wood floor.

5. The method of claim 1, wherein the providing includes providing a roll of the layered melted portion-foam composition, and the placing includes unrolling the layered melted portion-foam composition from the roll.

6. The method of claim 5, wherein the melted portion includes a polymer film attached hereto.

7. The method of claim 1, wherein at least one of the melted portion and the foam sheet is low-density polyethylene.

8. The method of claim 1, wherein the melted portion has a thickness of about 1 to about 5 mils.

9. The method of claim 1, wherein at least one of the melted portion and the foam sheet is cross-linked polyethylene.

10. The method of claim 1, wherein at least one of the melted portion and the foam sheet is a polyethylenic resin blended with other polymers.

11. The method of claim 1, wherein the melted portion is formed by melting a portion of the foam sheet.

12. The method of claim 11, wherein the melted portion is formed by applying heat to the foam sheet using a heated roller.

13. A method of installing a laminate wood floor over a subflooring, comprising:
    providing a layered melted portion-foam composition including a foam sheet and having a melted portion integrally formed, the foam sheet being a polyethylenic resin closed-cell foam having a thickness between about 0.03 to about 0.25 inches and a density of about 1 to about 6 pounds per cubic foot, the melted portion being a polyethylenic resin sheet having a thickness of about 1 to about 10 mils;
    placing a first segment of the layered melted portion-foam composition over the subflooring;
    placing a second segment of the layered melted portion-foam composition over the subflooring, the second segment overlapping a portion of the first segment; and
    after placing the second segment, laying the laminate wood floor over the first and second segments of the layered melted portion-foam composition.

14. The method of claim 13, further including attaching the first segment to the second segment.

15. A method of installing a laminate wood floor over a subflooring, comprising:
    providing a layered composition including a foam sheet having a melted portion integrally formed, the melted portion being a polymer that provides a smooth surface and the foam sheet being a polymer that provides cushioning, the foam sheet and the melted portion being formed of the same material;
    placing the layered melted portion-foam composition over the subflooring; and
    laying the laminate wood floor over the layered melted portion-foam composition.

16. The method of claim 15, wherein the foam sheet is a polyethylenic resin closed-cell foam.

17. The method of claim 15, wherein the foam sheet has a thickness between about 0.03 to about 0.1 inches.

18. The method of claim 17, wherein the melted portion is formed of the foam sheet and has a thickness of about 1 to about 10 mils.

19. The method of claim 17, wherein the foam sheet has a density of about 1 to about 6 pounds per cubic foot.

20. The method of claim 15, wherein the melted portion is in contact with the subflooring.

* * * * *